United States Patent
McHugh

(10) Patent No.: US 9,192,156 B2
(45) Date of Patent: Nov. 24, 2015

(54) DECOY SUSPENSION SYSTEM

(71) Applicant: Lawrence E. McHugh, Montross, VA (US)

(72) Inventor: Lawrence E. McHugh, Montross, VA (US)

(*) Notice: Subject to any disclaimer, the term of this patent is extended or adjusted under 35 U.S.C. 154(b) by 165 days.

(21) Appl. No.: 14/097,092

(22) Filed: Dec. 4, 2013

(65) Prior Publication Data

US 2014/0208628 A1 Jul. 31, 2014

Related U.S. Application Data

(60) Provisional application No. 61/758,237, filed on Jan. 29, 2013.

(51) Int. Cl.
A01M 31/06 (2006.01)

(52) U.S. Cl.
CPC ..................................... A01M 31/06 (2013.01)

(58) Field of Classification Search
CPC ........................................................ A01M 31/06
USPC ............. 43/2, 3; 446/5, 4; 248/579; 119/796, 119/795, 769; D22/125
See application file for complete search history.

(56) References Cited

U.S. PATENT DOCUMENTS

| | | | | |
|---|---|---|---|---|
| 765,204 A * | 7/1904 | Searles | ................ | B65H 75/406 242/396.1 |
| 942,103 A * | 12/1909 | Rigney | ..................... | A63F 9/305 43/2 |
| 1,428,216 A * | 9/1922 | Chase | ................... | A01M 29/06 43/3 |
| 1,629,442 A * | 5/1927 | Geisinger | ............. | A01M 31/06 43/3 |
| 2,028,849 A * | 1/1936 | Shay | ...................... | A01M 31/06 43/3 |
| 2,129,781 A * | 9/1938 | Park | ....................... | A01M 31/06 43/3 |
| 2,174,211 A * | 9/1939 | Hutaff, Jr. | ............. | A01M 31/06 43/3 |
| 2,393,417 A | 1/1946 | Ruttkay | | |
| 2,747,814 A * | 5/1956 | Taylor | .................... | A01M 31/06 43/3 |
| 3,046,192 A * | 7/1962 | Bilyen | .................. | A01M 31/00 43/2 |
| 3,315,642 A * | 4/1967 | Rogers | ................. | A01K 27/004 119/796 |
| 3,424,422 A * | 1/1969 | Klangos | .............. | A61M 5/1415 248/579 |
| 3,702,675 A * | 11/1972 | Bajo | ...................... | B65D 5/425 206/457 |
| 4,167,156 A * | 9/1979 | Kupperman | ......... | A01K 27/006 119/795 |
| 4,513,692 A * | 4/1985 | Kuhnsman | ........... | A01K 27/006 119/795 |
| 4,787,872 A * | 11/1988 | Bajo | ...................... | A63H 37/00 446/5 |
| 4,826,099 A * | 5/1989 | Johnson | ................ | A01M 31/06 43/3 |
| 4,887,552 A * | 12/1989 | Hayden | ................ | A01K 27/006 119/795 |
| 5,003,718 A * | 4/1991 | Lenert | ................... | A01M 31/06 43/3 |

(Continued)

FOREIGN PATENT DOCUMENTS

| | | | | |
|---|---|---|---|---|
| FR | 2671694 A1 * | 7/1992 | ............ | A01M 31/06 |
| GB | 406386 A * | 3/1934 | ............ | A01M 31/06 |

(Continued)

*Primary Examiner* — Darren W Ark

(57) ABSTRACT

The decoy suspension system is attached to a tree branch or other suitable support and suspends a decoy above the ground. The system includes a reel containing a retractable and extendible line. The reel is attached to the branch or support with a strap having mating hook and loop fasteners. The ease of the reel is preferably camouflaged. The line is preferably a low visibility transparent monofilament fishing line or similar material. The distal end of the line has a small toggle pin attached thereto that can be inserted into the back of the decoy to attach the decoy to the line. The decoy is preferably formed of thin sheets of foam plastic. The decoy may be partially filled with any readily available material to add mass. The swinging and swaying of the decoy at the end of the line produces realistic movement that attracts game animals to the site.

14 Claims, 3 Drawing Sheets

(56) References Cited

U.S. PATENT DOCUMENTS

| | | | | |
|---|---|---|---|---|
| 5,003,722 | A * | 4/1991 | Berkley | A01M 31/06 43/3 |
| 5,367,813 | A * | 11/1994 | Cherry | A01M 31/06 43/2 |
| 5,566,491 | A * | 10/1996 | Phillips | A01M 31/06 43/3 |
| 5,832,649 | A * | 11/1998 | Kilgore | A01M 31/06 43/2 |
| 5,839,394 | A * | 11/1998 | Dickison | A01K 27/005 119/795 |
| 5,974,720 | A * | 11/1999 | Bowling | A01M 31/06 43/2 |
| 6,044,581 | A * | 4/2000 | Shipman | A01M 31/06 43/3 |
| 6,289,849 | B1 * | 9/2001 | Macedo | A01K 27/004 119/796 |
| 6,311,425 | B1 * | 11/2001 | Capps | A01M 31/06 43/3 |
| 6,314,917 | B1 * | 11/2001 | Ryan | A01K 27/004 119/796 |
| 6,357,159 | B1 * | 3/2002 | Bowling | A01M 31/06 43/2 |
| 6,430,863 | B1 * | 8/2002 | Krag | A01M 31/06 43/3 |
| 6,510,644 | B1 * | 1/2003 | Gollnik | A01M 31/06 43/2 |
| 6,640,483 | B2 * | 11/2003 | Nelson | A01M 31/06 43/2 |
| 6,760,993 | B2 * | 7/2004 | Lebens | A01M 31/06 43/3 |
| 6,782,653 | B1 * | 8/2004 | Thomas | A01M 31/06 43/2 |
| 6,845,737 | B1 * | 1/2005 | Austin | A01K 15/025 119/795 |
| 6,907,688 | B2 * | 6/2005 | Brint | A01M 31/06 43/2 |
| 6,929,209 | B2 | 8/2005 | Baumgarten | |
| 7,121,222 | B1 * | 10/2006 | Johnston | B63B 21/22 114/293 |
| 7,137,221 | B2 * | 11/2006 | Highby | A01M 31/06 43/2 |
| 7,322,144 | B2 * | 1/2008 | Brewer | A01M 31/06 43/3 |
| 7,374,123 | B2 | 5/2008 | Han | |
| 7,434,347 | B1 * | 10/2008 | Powell | A01M 31/06 43/3 |
| 7,458,181 | B2 | 12/2008 | Butz | |
| 7,610,713 | B1 * | 11/2009 | Eilers | A01M 31/06 43/3 |
| 8,230,822 | B2 * | 7/2012 | Smith | A01K 27/004 119/796 |
| 8,402,685 | B1 * | 3/2013 | Marshall | A01M 31/06 43/2 |
| 8,485,856 | B2 * | 7/2013 | Paternostro | A01M 31/06 43/3 |
| 8,721,382 | B2 * | 5/2014 | Maidana Otero | A63H 37/00 446/5 |
| 8,739,456 | B1 * | 6/2014 | Butz | A01M 31/06 43/2 |
| 8,959,826 | B2 * | 2/2015 | Dean | A01M 31/06 43/2 |
| 2007/0099534 | A1 * | 5/2007 | Alas | A63H 33/00 446/5 |
| 2007/0251135 | A1 * | 11/2007 | Watlov | A01M 31/06 43/3 |
| 2008/0209792 | A1 * | 9/2008 | Watlov | A01M 31/06 43/2 |
| 2011/0017856 | A1 | 1/2011 | Penn | |
| 2013/0276718 | A1 * | 10/2013 | Valadez | A01K 27/004 119/796 |
| 2014/0116354 | A1 * | 5/2014 | Harris, II | A01K 27/004 119/796 |

FOREIGN PATENT DOCUMENTS

| | | | |
|---|---|---|---|
| GB | 2244199 | 11/1991 | |
| GB | 2441103 A * | 2/2008 | A01M 31/06 |

* cited by examiner

DECOY SUSPENSION SYSTEM

CROSS-REFERENCE TO RELATED APPLICATION

This application claims the benefit of U.S. Provisional Patent Application Ser. No. 61/758,237, filed Jan. 29, 2013.

BACKGROUND OF THE INVENTION

1. Field of the Invention

The present invention relates generally to hunting, fishing, and trapping, and particularly to a decoy suspension system for adjustably suspending a lightweight decoy from a tree or other overhead structure.

2. Description of the Related Art

Decoys have been known and used in hunting since the earliest of times. In their early history, decoys tended to be relatively crude and simple representations of the game animal being sought, due to the limited resources available for forming a realistic representation. As technology has advanced, more realistic decoys have been developed that can be difficult to distinguish from the real animal at a glance.

However, most decoys are merely visual representations of a given animal, and they do not imitate or replicate typical movement of the game animal being sought. The lack of animation in most decoys may tend to raise suspicions in many animals, and at the very least the lack of movement results in the decoy tending to blend into the stationary background, thus failing to catch the attention of the hunted animal through any movement of the decoy. While waterborne decoys, e.g., ducks and geese, may obviate this problem to some extent due to water movement affecting the decoys floating on the surface, this problem of lack of movement remains with land-based decoys.

As a result, some effort has been expended in providing animation for decoys. The means for animating the decoys may comprise relatively simple supports that allow the decoy to shift in the wind, to complex electrically powered devices that move the decoy and/or various appendages of the decoy in accordance with the electronic commands of the system, or as remotely commanded by the hunter. Such electrically powered animation results in relatively costly decoys, while simple supports do not generally provide the realistic movement desired, An example may be found in turkey decoys. Many such decoys are formed of very lightweight materials, such as thin sheets of foam plastic, and are conventionally supported on metal rods or stakes that are driven into the ground. The upper portion of the rod passes through a loose hole in the bottom of the body of the decoy, and the upper tip of the rod supports the inside of the back of the decoy to allow the decoy to pivot upon the tip of the rod or stake. The object is for any wind to cause some movement of the decoy. However, it generally requires a fairly good breeze to produce any significant movement, and the resulting movement is generally only a pivoting motion about the tip of the rod or stake. Also, wild turkeys will sometimes attempt to mate with the decoy (if the decoy is a hen) or fight with the decoy (if a torn decoy). Either action often knocks the decoy from its pivot point atop the stake or rod, negating any attraction that might have been provided by the decoy.

Thus, a decoy suspension system solving the aforementioned problems is desired.

SUMMARY OF THE INVENTION

The decoy suspension system is particularly suited for the suspension of a relatively lightweight decoy, such as those decoys formed of thin sheets of foam plastic material. This construction is often used to form decoys representing wild turkeys for the hunting of such animals, but may be used to form representations of other animals as well. The very lightweight construction enables the decoy to move readily when affected by a breeze.

The decoy suspension system includes a reel having an adjustable attachment, such as mating hook and loop fabric material (e.g., Velcro®), that enables the reel to be secured to an overhanging tree branch or other suitable overhead support. The reel may be similar to a conventional steel tape measure reel, and may include a conventional coil spring rewind mechanism and a conventional line lock to hold the suspension line at the desired extension length. The exterior of the reel is preferably finished in a camouflage pattern or in some form of concealing finish or cover to provide an unobtrusive appearance to animals.

A suspension line having low visibility characteristics, such as a transparent monofilament fishing line, is wound on the reel, and selectively extends and retracts therefrom. The distal end of the line has a small toggle pin thereon. The toggle pin is pushed through a small hole in the back of the decoy to lodge within the hollow body of the decoy. The length of the suspension line is adjusted at the reel to position the decoy a suitable distance above the surface, e.g., about nine inches, more or less, in the case of a wild turkey decoy. The decoy may be partially filled with a suitable mass, e.g., native leaves, twigs, soil, etc., that is readily available in the area to provide greater mass for more realistic movement upon encountering the breeze and expected interaction with other animals.

The suspended decoy will tend to swing and sway in even the lightest breezes, so that the substantially horizontal movement at the bottom of the arc defined by the distal end of the suspension line and the random pivoting of the decoy result in reasonably realistic motions to attract other animals. A swivel may be installed in the suspension line to permit the decoy to rotate in the wind without twisting the line. In the event that a live animal attempts to interact with the decoy, e.g., a tom turkey attempting to fight with a tom turkey decoy, the decoy will initially be deflected away from the animal, but will then swing back toward the live animal, thus appearing to return the aggressive moves of the animal. The result is that the animal will remain in the area to continue its aggression toward the decoy, providing the hunter with a shot at the animal and/or attracting other animals to the scene.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The decoy suspension system provides for the suspension of a reasonably lightweight decoy from an overhead arm, e.g., a tree branch, to allow the decoy to move freely in a light breeze. This movement, along with a reasonably realistic representation of the animal, attracts like animal species to a much greater extent than a stationary decoy placed upon the surface of the ground.

Figure 1:
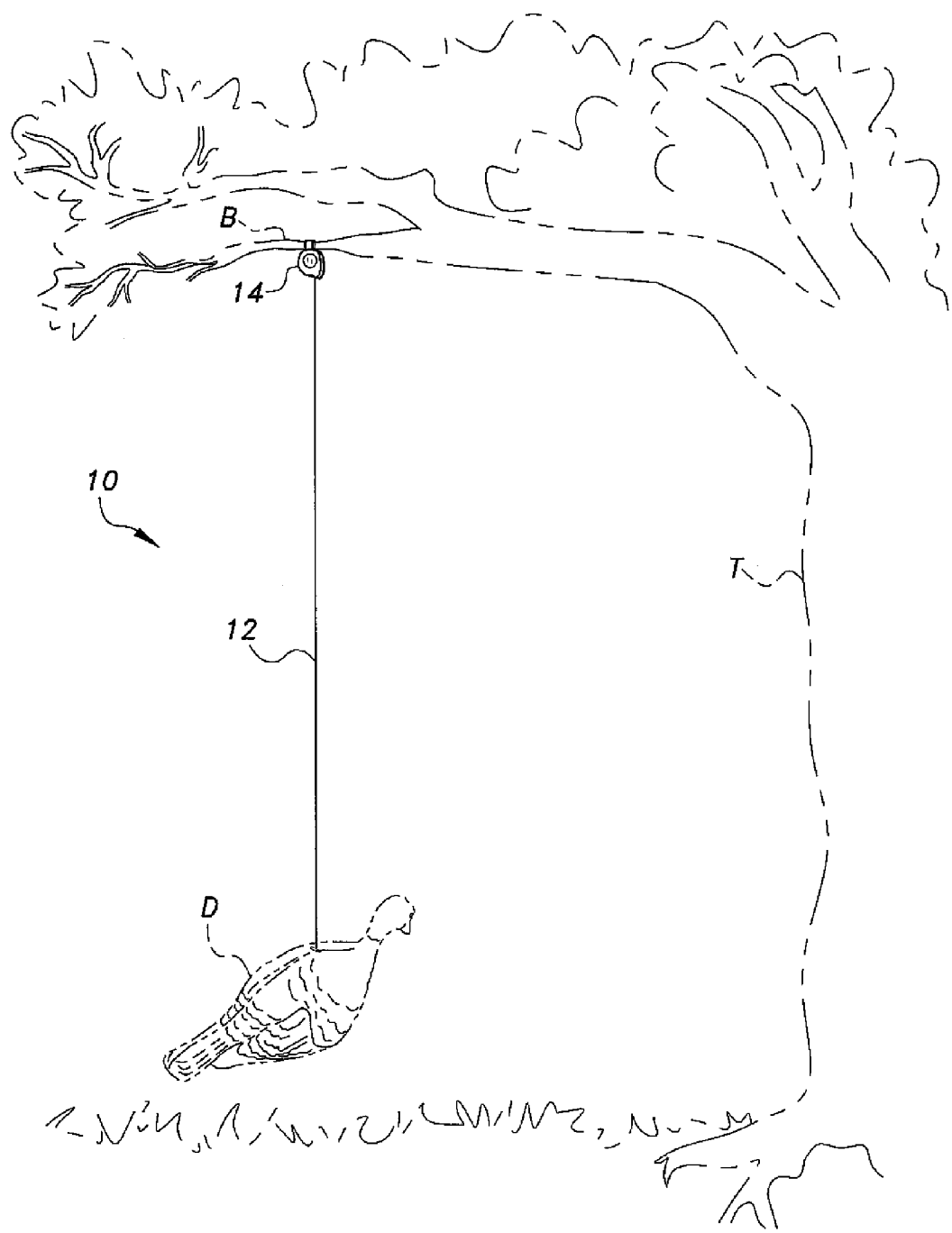
FIG. 1 is an environmental, perspective view of a decoy suspension system according to the present invention, illustrating the system in use for suspending a lightweight turkey decoy from a tree.

FIG. 1 of the drawings provides an environmental view of the decoy suspension system 10, shown suspended from an overhanging branch B of a tree T and having a decoy D mounted thereon. The decoy suspension system 10 comprises a reel having a selectively extendible and retractable decoy suspension line 12 extending therefrom. The suspension line 12 is preferably of relatively low visibility to minimize the chance of detection by game animals, and is preferably formed of a length of transparent monofilament fishing line or the like. The reel is conventional and is urged to retract the suspension line 12 by a coil rewind spring. The reel and spring are disposed within a case 14. This structure is similar to a conventional retractable steel tape measure, but with the decoy suspension line 12 being installed in place of the steel tape.

Figure 2:
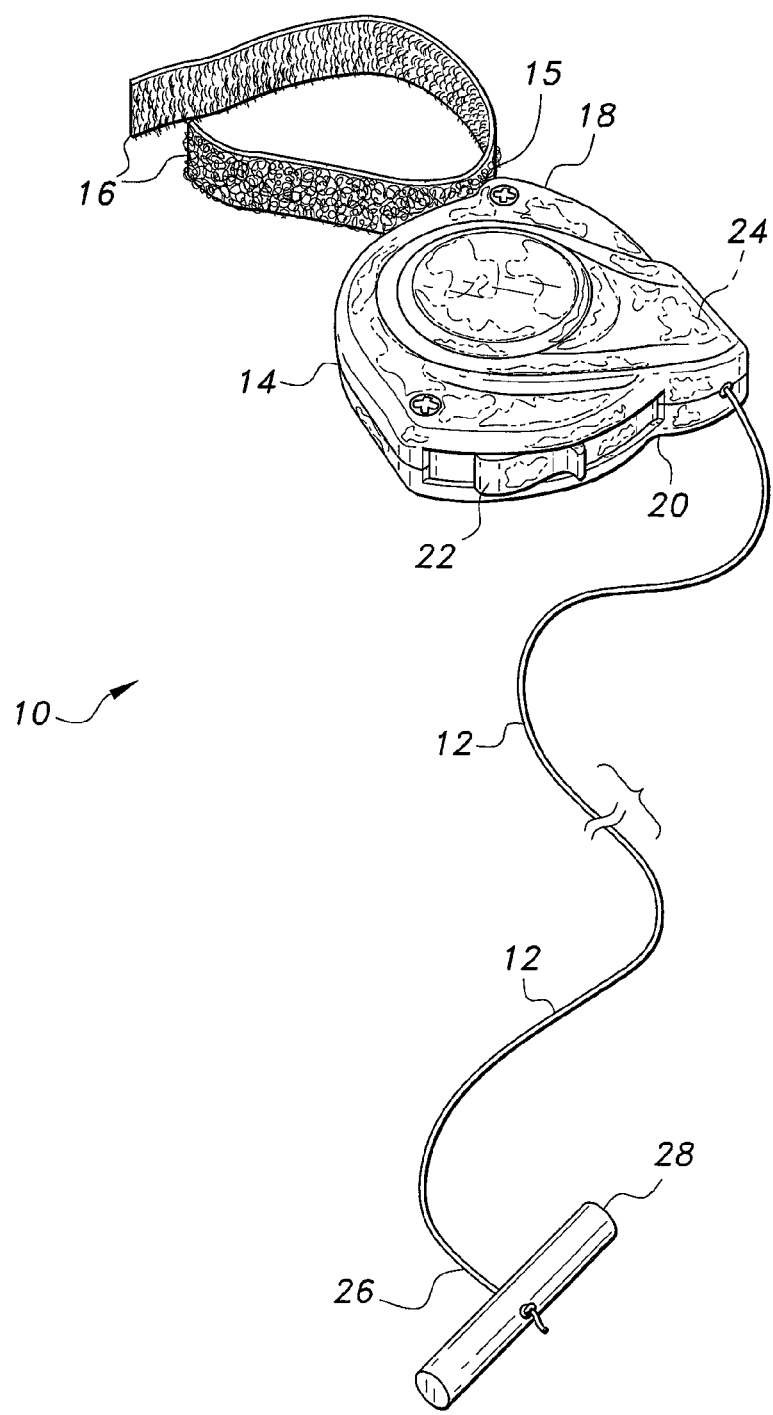
FIG. 2 is a detailed perspective view of the decoy suspension system of FIG. 1, showing the reel and the decoy attachment toggle pin attached to the distal end of the line.

FIG. 2 illustrates further details of the decoy suspension system 10. The reel case 14 has first and second lengths of mating hook and loop fastener material 16, e.g., Velcro®, attached to the upper side 18 of the case 14. The lengths of hook and loop fastener material 16 define a diametrically adjustable attachment strap when adjustably secured to one another to allow for varying diameters of arms or branches B about which they may be secured. The strap having an intermediate portion 15 attached to the upper side 18 of the case 14 between the first and second lengths of mating hook and loop fastener material 16 such that the first and second lengths of mating hook and loop fastener material extend therefrom. The decoy suspension line 12 extends from a passage in the lower side 20 of the case 14. A line lock 22 has a lever or slide extending from the lower side 20 of the case 14 to selectively lock or grip the decoy suspension line 12 at the desired length from the reel and its case 14. The line lock 22 is conventional, as found in conventional steel tape measures and the like. The reel case 14 may include a low visibility or camouflage pattern 24 disposed thereon, e.g., paint, a cloth cover, etc., to conceal the normal shiny bare metal or bright plastic of which most such cases are formed.

The distal end 26 of the decoy suspension line 12 includes a decoy attachment 28 extending therefrom. The type of decoy D with which the present decoy suspension system 10 is intended for use is formed of relatively thin sheets of lightweight foam plastic material assembled to provide a three-dimensional body having a hollow interior. This type of decoy structure is conventional and is widely known and used by hunters in the field. The thin plastic panels of which they are formed are finished with a realistic finish to simulate the appearance of the represented game, and may be folded flat for efficient transport when not deployed.

Accordingly, the decoy attachment is preferably a rigid toggle pin 28, as shown in FIG. 2. The distal end 26 of the suspension line 12 passes generally through the center of the toggle 28. The toggle 28 may comprise any relatively thin and elongate configuration, e.g., a small, rolled metal pin, such as those used for securing the elastic band to a Halloween or masquerade mask, or a solid dowel or the like. Such a small pin is adequate for suspending a lightweight decoy of the type intended for use with the present decoy suspension system 10. The decoy attachment pin 28 may be oriented parallel to the distal end 26 of the suspension line 12, and passed through a small hole in the back of the decoy D. The pin or toggle 28 is then turned normal to the distal end 26 of the line, thereby being captured within the hollow body of the decoy D to suspend the decoy D from the line 12. Optionally a conventional line swivel (not shown), as used in fishing tackle between the distal end of the leader and a fishing lure, may be attached to the distal end 28 of the line 12, and the decoy attachment may allow the decoy D to swivel freely. The toggle pin 28 may be removed from the decoy D when the interior of the decoy is accessed during disassembly for transport or storage.

Figure 3:
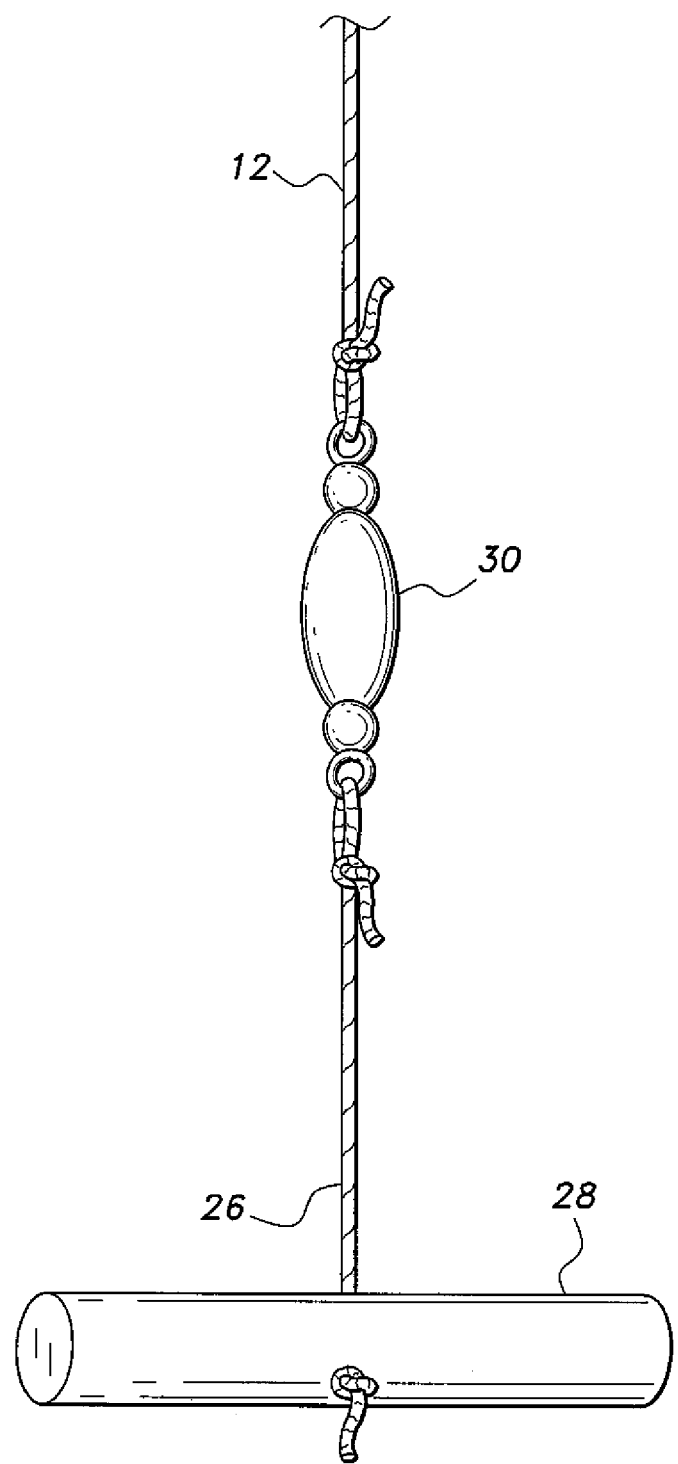
FIG. 3 is a partial perspective view of the distal portion of the line and toggle pin of the decoy suspension system according to the present invention, illustrating an alternative swivel connector installed in the line.

FIG. 3 of the drawings illustrates an optional swivel connector 30 installed in the line 12. The swivel connector 30 is preferably installed relatively close to the toggle pin 28 in order to allow the major portion of the line 28 between the swivel 30 and the reel case 14 to retract into the reel case, but other locations may be used, if desired. The installation of such a swivel connector 30 in the suspension line 12 permits the decoy D to revolve freely according to any breezes encountered without twisting the suspension line 12.

The decoy suspension system 28 is particularly well suited for use with lightweight decoys representing relatively small game. The suspension system 28 is illustrated as supporting a wild turkey hen decoy D in FIG. 1. Conventionally, wild turkey decoys (either toms or hens) are supported on stakes set into the ground, and the rigid stakes limit the movement of the decoys. The reel, or more properly the reel case 14, of the decoy suspension system 10 is secured to an overhanging arm, e.g., a tree branch B, by means of the adjustable strap 16 extending from the case 14, the decoy suspension line 12 is extended therefrom, and the extended line 12 is locked by means of the line lock 22 to prevent its retraction back into the case 14. The wild turkey or other decoy D is attached to the distal end 26 of the line 12 as described above, and the extended length of the line 12 is adjusted by using the line lock 22 to suspend the decoy D at some realistic distance above the ground, e.g., nine inches or so. The decoy suspension system 10 allows the decoy D to sway slightly and turn in a slight breeze, thereby providing reasonably realistic movement for the decoy. The swivel connector 30 allows the decoy D to rotate with the wind, and precludes twisting of the line 12.

The decoy suspension system 10 may be provided or sold with or without the decoy D. The light weight of the hollow foam plastic decoy D may be ballasted as required by using readily available materials at the site (e.g., small twigs and branches, leaves, soil, etc.) to add greater mass to resist excessive movement in higher breezes. While the decoy suspension system 10 is primarily directed to use with wild turkey decoys D, it will be seen that it is readily adaptable to many other types of decoys representing a wide range of different animal species.

It is to be understood that the present invention is not limited to the embodiments described above, but encompasses any and all embodiments within the scope of the following claims.

I claim:

1. A decoy suspension system, comprising:
a reel having a case, the case having an upper side and a lower side;
a diametrically adjustable arm attachment extending from the upper side of the case, wherein the diametrically adjustable arm attachment comprises mutually mating first and second lengths of hook and loop fastener material which define a strap, the strap having an intermediate portion attached to the upper side of the case between the first and second lengths of mating hook and loop fastener material such that the first and second lengths of mating hook and loop fastener material extend therefrom;

a decoy suspension line selectively extending from the reel through the lower side of the case, the line having a distal end;

a decoy attachment extending from the distal end of the line; and a decoy removably attached to the decoy attachment, wherein the decoy is formed of thin sheets of plastic foam material.

2. The decoy suspension system according to claim 1 wherein the decoy is a wild turkey decoy.

3. The decoy suspension system according to claim 1, wherein said reel case further comprises:

a coil rewind spring disposed in the case, the spring communicating mechanically with the line; and a line lock disposed upon the case, the line lock selectively gripping the line and preventing retraction of the line into the case, the line being formed of transparent plastic monofilament.

4. The decoy suspension system according to claim 1, wherein the decoy attachment comprises a toggle pin disposed upon the distal end of the line.

5. The decoy suspension system according to claim 1, wherein said reel case has a camouflage finish.

6. A decoy suspension system, comprising:

a reel having a case, the casing having an upper side and a lower side;

means for attaching the reel to a supporting structure, the means extending from the upper side of the case, wherein the means for attaching comprises a diametrically adjustable arm attachment, the diametrically adjustable arm attachment comprising mutually mating first and second lengths of hook and loop fastener material which define a strap, the strap having an intermediate portion attached to the upper side of the case between the first and second lengths of mating hook and loop fastener material such that the first and second lengths of mating hook and loop fastener material extend therefrom;

a decoy suspension line selectively extending from the reel through the lower side of the case, the line having a distal end;

a decoy attachment extending from the distal end of the line; and a decoy removably attached to the decoy attachment, wherein the decoy is formed of thin sheets of plastic foam material.

7. The decoy suspension system according to claim 6, wherein the decoy is a wild turkey decoy.

8. The decoy suspension system according to claim 6, wherein said reel case further comprises:

a coil rewind spring disposed in the case, the spring communicating mechanically with the line; and a line lock disposed upon the case, the line lock selectively gripping the line and preventing retraction of the line into the case, the line being formed of transparent plastic monofilament.

9. The decoy suspension system according to claim 6, wherein the decoy attachment comprises a toggle pin disposed upon the distal end of the line.

10. The decoy suspension system according to claim 6, wherein said reel case has a camouflage finish.

11. A decoy suspension system, comprising:

a reel having a case, the case having an upper side and a lower side;

a diametrically adjustable arm attachment extending from the upper side of the case, wherein the diametrically adjustable arm attachment comprises mutually mating first and second lengths of hook and loop fastener material which define a strap, the strap having an intermediate portion attached to the upper side of the case between the first and second lengths of mating hook and loop fastener material such that the first and second lengths of mating hook and loop fastener material extend therefrom;

a transparent plastic monofilament decoy suspension line selectively extending from the reel through the lower side of the case, the line having a distal end;

a coil rewind spring disposed in the case, the spring communicating mechanically with the line;

a line lock disposed upon the case, the line lock selectively gripping the line and preventing rotation of the line into the case;

a decoy attachment extending from the distal end of the line; and a decoy removably attached to the decoy attachment, wherein the decoy is formed of thin sheets of plastic foam material.

12. The decoy suspension system according to claim 11, wherein the decoy is a wild turkey decoy.

13. The decoy suspension system according to claim 11, wherein the decoy attachment comprises a toggle pin disposed upon the distal end of the line.

14. The decoy suspension system according to claim 11, wherein said reel case has a camouflage finish.

* * * * *